United States Patent [19]

Isobe et al.

[11] 4,274,078
[45] Jun. 16, 1981

[54] MIRROR ASSEMBLY WITH INDICATOR

[75] Inventors: Takayuki Isobe, Yokohama; Mikio Matsuzaki, Isehara, both of Japan

[73] Assignees: Nissan Motor Company, Limited, Yokohama; Ichiko Industries Limited, Tokyo, both of Japan

[21] Appl. No.: 41,335

[22] Filed: May 22, 1979

[30] Foreign Application Priority Data

May 22, 1978 [JP] Japan .................................. 53-67725

[51] Int. Cl.³ .............................................. G02B 5/08
[52] U.S. Cl. ..................................... 340/98; 116/202; 116/287
[58] Field of Search ......................... 116/202, 49, 287; 340/98; 350/98; 362/80

[56] References Cited

U.S. PATENT DOCUMENTS

| 1,473,307 | 11/1923 | McGrath | 340/98 |
| 1,533,508 | 4/1925 | Miller, Jr. | 340/98 |
| 2,113,829 | 4/1938 | Condon | 340/98 |
| 2,561,582 | 7/1951 | Markel | 340/98 X |
| 2,672,841 | 3/1954 | Mitzberg | 116/28 R |
| 2,693,589 | 11/1954 | Hopkins | 340/98 |
| 3,352,277 | 11/1967 | Schmidt | 116/202 |

FOREIGN PATENT DOCUMENTS

| 50-34859 | 9/1975 | Japan | 116/202 |
| 1115651 | 5/1968 | United Kingdom | 340/98 |

Primary Examiner—Daniel M. Yasich

[57] ABSTRACT

An assembly is provided which includes a mirror body for holding a mirror and at least one container for holding an indicator. The container includes a window portion under an opening formed in the mirror body within which the mirror is disposed. The mirror body is mounted to a portion of an automobile within a visible region of a driver so that the driver can easily recognize the indication produced by the indicator.

4 Claims, 8 Drawing Figures

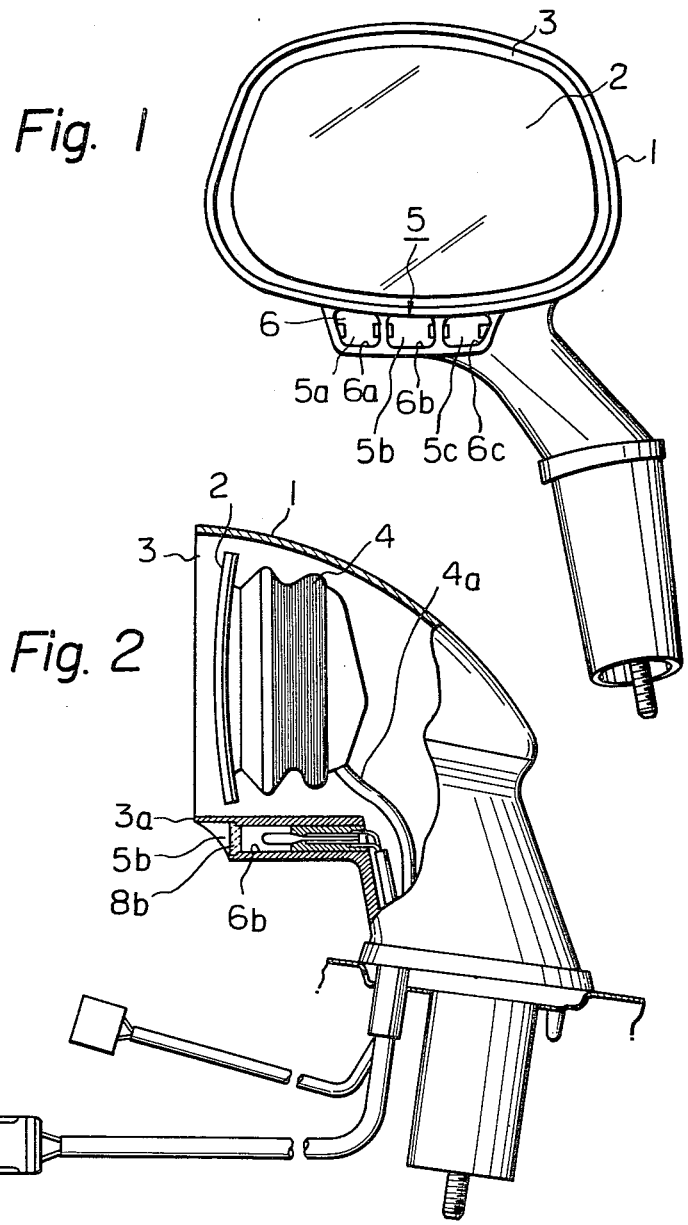

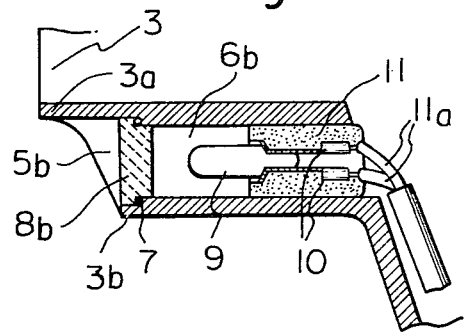
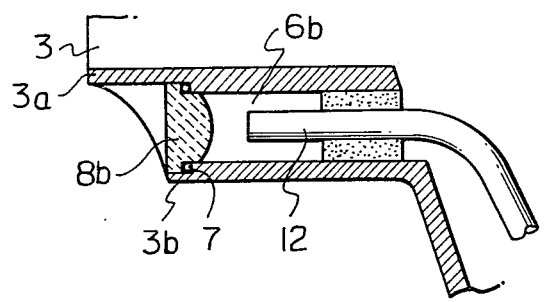
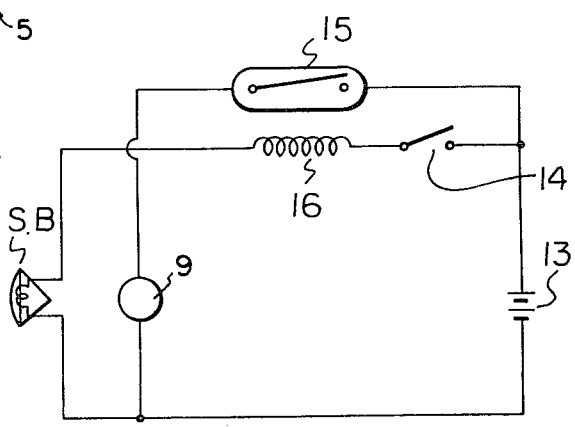

MIRROR ASSEMBLY WITH INDICATOR

BACKGROUND OF THE INVENTION

The present invention relates to a mirror assembly for automotive vehicles.

More particularly, the invention relates to an outside mirror assembly, for automotive vehicles, equipped with an indicator unit including, for example, the indication when the headlamp fails to produce light, the indication when the front or rear combination lamps fail to produce light, the warning when the level of window washer fluid is below a certain level.

It is possible that an accident may occur, especially under adverse conditions, such as occur at night or during wet weather, should a driver be unaware that a device is not performing its normal function. Therefore, it is desirable that an indicator unit is installed in an outside mirror so that the driver can easily aware whether or not the device functions normally. If the indicator unit is installed in the outside mirror, the driver can see the indicator unit easily while driving so that a problem that the headlamp is left turned off even under day lights or a problem that the shortage in window washer fluid is left unfilled are solved.

SUMMARY OF THE INVENTION

An object of the invention is therefore to provide a mirror assembly for a mirror and an indicator.

According to the mirror assembly of the invention, a container is provided for holding an indicator and the container includes a window portion disposed under an opening in a mirror body within which a mirror is to be disposed.

BRIEF DESCRIPTION OF THE DRAWINGS

In the accompanying drawings:

FIG. 1 is a plan view of a mirror assembly of the invention;

FIG. 2 is a side elevation, partly sectioned, of the mirror shown in FIG. 1;

FIG. 3 is a fragmentary enlarged view of FIG. 2;

FIGS. 4(A), 4(B) and 4(C) show various types of lenses;

FIG. 5 is a similar view to FIG. 3 showing another embodiment of the invention; and FIG. 6 is a circuit diagram for the indicator.

DESCRIPTION OF THE PREFERRED EMBODIMENTS

Shown in FIGS. 1 and 2 is an outside or fender mirror assembly of the remote control type wherein a hollow mirror body 1 has mounted therein a reflecting mirror 2. The mirror 2 is disposed within a cowl portion of the body 1 and having a rear end opening 3 (See FIG. 2), and an actuator unit 4 behind the mirror 2 for the purpose of adjusting the mirror 2 horizontally and/or vertically as desired. The actuator unit 4 is connected to a cord 4a leading to a control switch, not shown.

Designated generally by the reference numeral 5 is an indicator assembly which includes a plurality of, three in this embodiment, containers 5a, 5b and 5c for holding indicators, respectively, which may be circuited in warning or alarming or monitoring circuits. These containers are arranged with respect to the hollow of the mirror body 1 in the manner described as follows.

Each of the containers includes a window portion 8b under the opening 3 and a storing space or chamber 6b (or 6a or 6c) as shown in FIGS. 2 and 3. Each window portion is recessed from the edge of the perimeter portion 3a defining the opening 3.

The mirror body 1 is formed with the storing chambers, in the form of a bore, 6a, 6b and 6c as arranged along the perimeter portion 3a defining the opening 3. All of these bores extend in parallel to each other and ends facing in the same direction as the opening 3 does.

As shown in FIG. 3, a shoulder 3b is formed near the open end of each bore in order to receive the window portion 8b, in the form of a glass. Arranged behind the window portion 8b is a source of light for the indicator, in the form of a wedge-shaped bulb 9. The bulb 9 is received in a socket 11 including terminals 10 and cords 11a leading from the terminals, respectively. The socket 11 is partly made of a water-resistant material so that the socket 11 is sealingly fitted to close the opposite end of the bore to the end formed with the shoulder 3b. As will be noted from the inspection of FIGS. 2 and 3, the window portion 8b is disposd under and within a plane withdrawn or recessed from a plane where the edge of the perimeter portion 3a.

It will be noted that the edge 3a provides a canopy which casts a shadow on the window portion so that even under the bright day the indication by the indicator can be easy to be seen by the driver.

Although, in FIG. 3, the window portion takes the form of a plane glass, it may take the form of a lens. For example, any one of the lenses shown in FIGS. 4(A), 4(B) and 4(C) may be employed. FIG. 4(A) shows a convex lens, FIG. 4(B) a Fresnel lens and FIG. 4(C) a fish-eye lens.

It will be noted that if the lens is used as the window portion of each container to direct the indication light produced toward the driver's seat, the driver can easily see the indication.

Although, in FIG. 3, the wedge-shaped bulb is used, it is possible to use an optical fiber 12 as shown in FIG. 5. In the case of FIG. 5, an optical fiber 12 leads from a source of light, separately mounted, to conduct light. As the source of light for this purpose, a headlight or rear combination lamps or front combination lamps to be monitored can be used.

One example of a circuit diagram which may apply to any one of the indicators is illustrated in FIG. 6 as applied to the indicator 5a. The circuit in FIG. 6 is designed to indicate in the event a headlamp SB functions normally to produce light. It includes a source of electricity 13, a main switch 14 for energizing the headlamp SB, a lead switch 15, a coil 16 and an indicator lamp as the indicator 5a.

In operation, if the headlamp SB produces light when the main switch 14 is closed, the coil 16 will be energized to close the lead switch, thus causing the indicator lamp to produce an indication that the headlamp SB functions normally.

The other indicators 5b and 5c may monitor any of the condition indicating devices, as for example, the front combination lamps and the rear combination lamps using the similar circuit.

Referring to the arrangement of cords leading to the indicators, it is preferable that these cords may extend through or penetrate through the already formed passage or provision for the cord 4a leading to the actuator unit 4.

In the example illustrated in FIG. 6, the circuit for the indicator is designed to cause the indication when the device to be monitored functions normally. The circuit for the indicator is not limited to this example. It is, for example, possible to design the circuit so that the indication is produced when a device to be monitored does not function normally.

In the preceding description, the invention has been described as applied to an outside mirror assembly of the remote control type. The application of the invention is not limited to this. It is possible to apply the invention to an outside mirror without such remote control means. In this case the cords for the indicators may attached along the outside surface of the mirror body.

What is claimed is:

1. In a vehicle equipped with various condition indicating devices, a rear vision mirror assembly comprising:
    a housing including a cowl portion having an opening;
    a mirror disposed within said cowl portion and adapted to be observed through said opening;
    means adjacent the mirror in said housing defining a plurality of containers each of which receive illuminable indicator means therein, said containers being sequestered with respect to the level of said opening so as to be shaded by said cowl portion; and
    means for interconnecting said illuminable indicator means with means for monitoring said various devices of said vehicle and for selectively illuminating said illuminable indicator means in response to the operation of said various devices.

2. In a vehicle equipped with various condition indicating devices, a rear vision mirror assembly comprising:
    a housing including a cowl portion having an opening;
    a mirror pivotally mounted within said cowl portion and adapted to be observed through said opening;
    control means operatively connected with and leading from said pivotally mounted mirror for enabling the remote manual adjustment of the orientation of said mirror within said cowl portion;
    means adjacent the mirror in said housing defining a plurality of containers each of which receive illuminable indicator means therein, said containers being sequestered with respect to the level of said opening so as to be shaded by said cowl portion: and
    means for interconnecting said illuminable indicator means with means for monitoring said various devices of said vehicle and for selectively illuminating said illuminable indicator means in response to the operation of said various devices.

3. A rear vision mirror assembly as claimed in claim 2, wherein each of said containers is closed by a translucent window which takes the form of a lens.

4. A rear vision mirror assembly as claimed in claim 2, wherein said illuminable indicator means takes the form of an optical fibre.

* * * * *